United States Patent [19]
Appolonia et al.

[11] Patent Number: 5,878,582
[45] Date of Patent: Mar. 9, 1999

[54] METHOD AND APPARATUS FOR FREEZING FOOD PRODUCTS

[75] Inventors: John J. Appolonia, Yardley, Pa.;
William M. Kulik, Cranford, N.J.;
Michael D. Newman, Plainsboro, N.J.;
John T. Schoepp, Piscataway, N.J.

[73] Assignee: The BOC Group, Inc., New Providence, N.J.

[21] Appl. No.: 851,924

[22] Filed: May 6, 1997

Related U.S. Application Data

[63] Continuation-in-part of Ser. No. 580,113, Jan. 29, 1996, abandoned, which is a continuation-in-part of Ser. No. 412,238, Mar. 28, 1995, abandoned.

[51] Int. Cl.$^6$ .............................. F25D 13/06; F25D 17/02
[52] U.S. Cl. .................................... 62/63; 62/64; 62/374; 62/380
[58] Field of Search .............................. 62/62, 374, 380, 62/63, 64

[56] References Cited

U.S. PATENT DOCUMENTS

| | | | |
|---|---|---|---|
| 3,553,973 | 1/1971 | Moran | 62/380 X |
| 3,605,434 | 9/1971 | Boese | 62/380 X |
| 4,912,943 | 4/1990 | Hubert et al. | 62/374 |
| 4,972,681 | 11/1990 | Lofkvist | 62/374 |
| 4,992,289 | 2/1991 | Kiczek | 62/374 X |
| 5,349,828 | 9/1994 | Lee et al. | 62/374 X |
| 5,509,277 | 4/1996 | Kiczek et al. | 62/374 |
| 5,522,227 | 6/1996 | Appolonia et al. | 62/374 X |
| 5,630,327 | 5/1997 | Kiczek et al. | 62/374 |

*Primary Examiner*—Christopher B. Kilner
*Attorney, Agent, or Firm*—William A. Schoneman; Salvatore P. Pace

[57] ABSTRACT

Apparatus and method for freezing food products including a first freezer section utilizing a liquid or solid cryogen and a second freezer section which utilizes cryogenic vapor from the first freezer section to complete the freezing operation, the first and second freezer sections being in a vertical arrangement to minimize floor space and improve cooling efficiency.

45 Claims, 9 Drawing Sheets

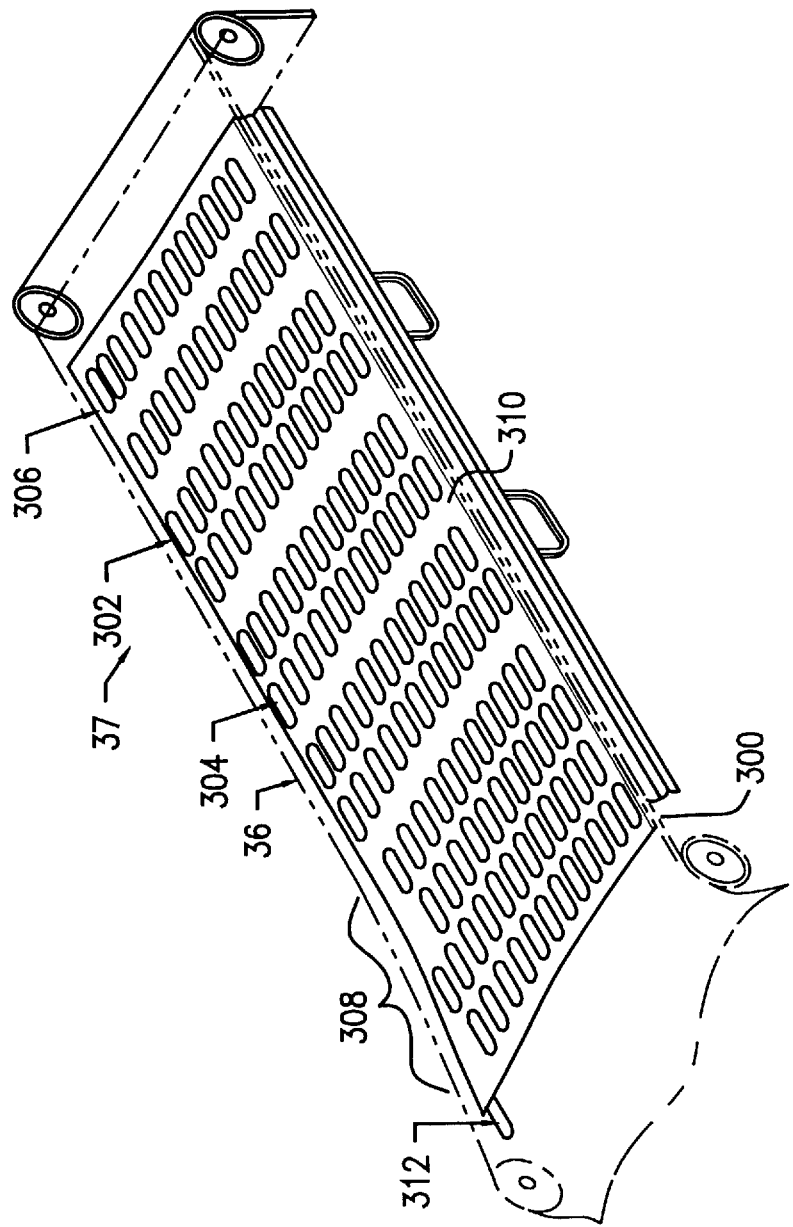

METHOD AND APPARATUS FOR FREEZING FOOD PRODUCTS

RELATED APPLICATIONS

This application is a continuation-in-part of pending U.S. Ser. No. 08/580,113 filed Jan. 29, 1996 which is continuation-in-part application of U.S. Ser. No. 08/412,238 filed on Mar. 28, 1995, now abandoned.

TECHNICAL FIELD

The present invention is directed to an apparatus and method for freezing food products employing the combination of a liquid or solid cryogenic freezer section and a second freezer section employing cryogenic vapor from the first freezer section wherein the two sections are arranged vertically so as to minimize construction cost, floor space and cryogenic vapor loss.

BACKGROUND OF THE INVENTION

The commercial freezing of food products, especially soft food products such as shrimp, scallops, vegetables, meat and the like is often carried out rapidly to minimize water loss and damage to the product. Quick freezing may be carried out using cryogenic substances such as liquid nitrogen and solid carbon dioxide.

Among the more common cryogenic quick freezing techniques are those employing either a freezing tunnel or an immersion bath. Freezing tunnels are elongated chambers which may contain spaced apart nozzles that are used to spray the cryogenic substance on top of the food product as it passes through the tunnel on a conveyor. Heat exchange between the food product and the cryogenic substance produces cryogenic vapor which is circulated by fans to improve cooling efficiency.

The liquid cryogen immersion bath system provides for a vessel containing a liquid cryogen (e.g. liquid nitrogen) and a conveyor passing there through to thereby immerse the food product in the liquid cryogen. The immersion bath system is advantageous over tunnel systems because freezing is faster. However, the efficiency of the immersion bath system is generally no better than most tunnel systems, typically because the cryogenic vapor generated in the immersion bath is not effectively utilized.

In an effort to improve the efficiency of quick freezing, systems have been developed that utilize the combination of a liquid immersion bath and a freezer tunnel. In such systems the unfrozen product is introduced into the liquid immersion bath and moved along the bath on a conveyor. The immersion bath provides the first stage of cooling. A cryogenic vapor is produced via heat exchange between the food product and the liquid cryogen. The food product which emerges from the bath is passed into a freezing tunnel which is typically positioned downstream of the immersion bath. The cryogenic vapor is drawn into the tunnel by fans to complete the freezing process. Such systems are disclosed, for example, in R.C. Webster et al., U.S. Pat. No. 3,485,055; I. Rasovich, U.S. Pat. No. 4,403,479; L. Tyree, Jr. et al., U.S. Pat. No. 4,783,972; P. Gibson, U.S. Pat. No. 4,843,840; A. Acharya et al., U.S. Pat. No. 4,852,358; I. Rasovich, U.S. Pat. No. 4,858,445; E. Kiczek et al., U.S. Pat. No. 5,168,723; E. Kiczek et al., U.S. Pat. No. 5,220,802; E. Kiczek et al., U.S. Pat. No. 5,220,803; and R. Howells, U.S. Pat. No. 5,267,490.

The combination of a liquid immersion bath and a downstream freezer tunnel, particularly those using circulated cryogenic vapor provide improved cooling efficiency over systems using the immersion bath alone or the freezer tunnel alone. However, the combined system suffers from a number of disadvantages. Since the freezer tunnel extends horizontally from the immersion bath, the combined system occupies a large amount of floor space and is relatively expensive to construct. Furthermore, high energy fans are needed to draw the cryogenic vapor from the immersion bath into and through the elongated freezer tunnel, thereby increasing the cost of operating the combined system.

In addition, the combined systems of the prior art typically have an entrance leading into the immersion bath and an exhaust outlet at the remote end of the freezer tunnel. In this type of arrangement it is difficult to control the flow of cryogenic vapor within the freezing apparatus and also difficult to prevent loss of the same.

It would therefore be a significant advance in the art of freezing food products if a combined freezer system, utilizing both an immersion bath and a freezer tunnel could be made more compact, less costly and operate more efficiently than present combined freezer systems.

SUMMARY OF THE INVENTION

The present invention is directed to an apparatus and method for freezing food products in a compact, and energy efficient manner. The freezer system of the present invention employs a first freezing operation utilizing a liquid or solid cryogen and a second freezing operation utilizing cryogenic vapor generated from heat exchange of the food product with the liquid or solid cryogen of the first freezing operation. In accordance with the present invention, the first freezing operation is positioned immediately above the second freezing operation.

The entire freezing apparatus is contained within a housing which occupies significantly less floor space than conventional combined freezer systems.

More specifically, the present invention is directed to an apparatus and method for freezing a food product comprising:

a) a housing having an entrance for receiving unfrozen food product and an exit;

b) a first freezing means for receiving the unfrozen food product from the entrance and for contacting said unfrozen food product with a liquid or solid cryogenic substance to at least partially freeze the food product and produce a cryogenic vapor;

c) a second freezing means positioned below the first freezing means for receiving the partially frozen food product and completing the freezing of the food product while directing the food product towards the exit of the housing; and d) circulation means for circulating the cryogenic vapor from the first freezing means to the partially frozen food product contained in the second freezing means to thereby complete the freezing operation.

In a preferred form of the present invention, multiple vessels containing a liquid cryogen are provided for the first freezing means. The food product travels from one immersion bath to another by conveyors traveling in opposite directions so that the vessels may be arranged essentially in a single column with the second freezing means positioned below the lowermost vessel.

The present invention may also be provided with an exhaust control system which minimizes cryogenic vapor loss, maintains a safe level of cryogenic vapor in the freezer and provides exceptional cooling efficiency. More specifically, the exhaust control system comprises:

a) a temperature sensing means positioned within the entrance of the housing for determining the temperature within the entrance of the freezing apparatus and for transmitting a first signal corresponding to the sensed temperature;

b) temperature comparing means for comparing the first signal to a predetermined temperature and for generating a second signal corresponding to the difference between the first signal and the predetermined temperature; and c) exhaust control means comprising a motor operatively connected to a fan for drawing exhaust gas from the freezing apparatus and second signal detection means for detecting the second signal from the temperature comparing means and adjusting the speed of the fan in response to the second signal.

In one aspect of the exhaust control system, the speed of the fan is adjusted by comparing the actual difference between the entrance temperature and the temperature within the freezing apparatus itself (DT) and a predetermined difference in said temperatures (i.e. $DT_1$).

In a further aspect of the present invention, there is provided a cleaning system for removing debris, such as residual food product and/or ice from the second freezer means while the freezing apparatus is operational. Conventional cleaning systems can be used for this purpose. It is preferred however, to employ a unique cleaning system in which movement of a conveyor belt used for transporting the frozen food product provides the force for directing an impact device against the conveyor belt in a manner sufficient to dislodge debris thereon.

In a still further aspect of the invention, cryogenic vapor flow control means is employed to provide more uniform cooling of the food products as they pass along the conveyer belt in the second freezing means. In one embodiment of the invention, the cryogenic vapor flow control means is comprised of a plate having a plurality of rows of openings which allow the upward flowing cryogenic vapor to pass there-through under controlled conditions to uniformly complete the freezing operation.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 8 is a perspective view of a diffuser plate placed below the conveyor belt in the second freezer section for uniformly distributing the cryogenic vapor to the food product traveling along the conveyor belt.

DETAILED DESCRIPTION OF THE INVENTION

The present invention is directed to an apparatus for freezing food products in which a first freezer section and a second freezer section are vertically arranged to reduce cost and floor space and provide more efficient cooling.

Figure 1:
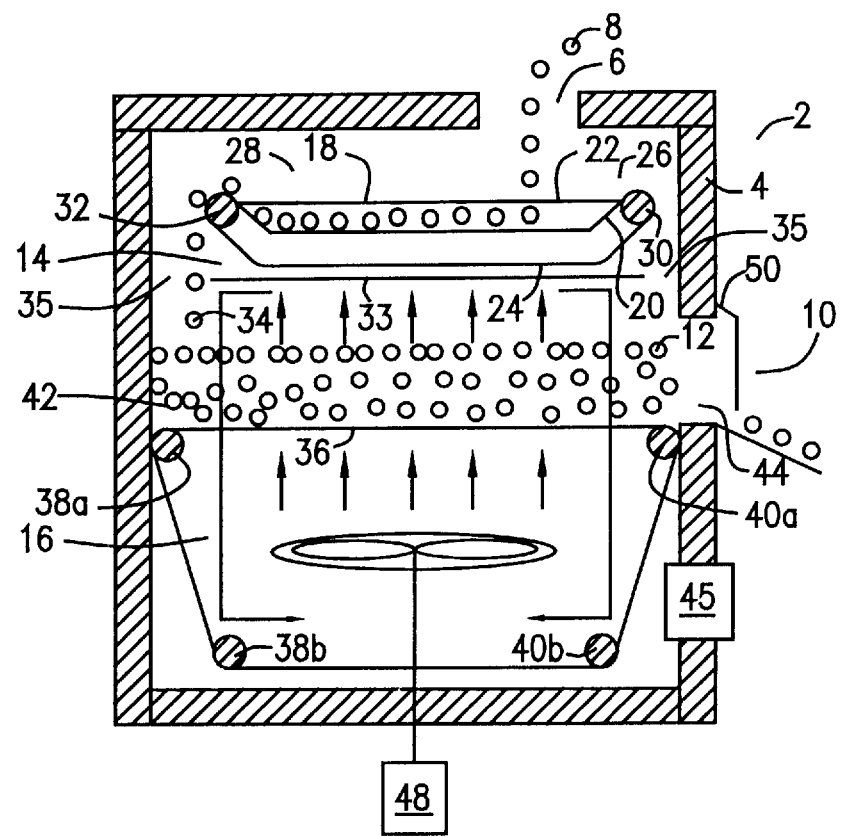
FIG. 1 is a schematic cross-sectional view of an embodiment of the invention employing a single vessel containing a liquid cryogen in the first freezer section.

Referring first to FIG. 1 there is shown an embodiment of the invention in which the first freezer section contains a single vessel containing a liquid cryogen. As shown specifically in FIG. 1, a freezing apparatus 2 includes a housing 4 having an entrance 6 for receiving an unfrozen food product 8 and an exit 10 for discharging the food product 12 in the desired state of freezing.

In accordance with the present invention, the freezing apparatus 2 includes a first freezer section 14 and a second freezer section 16. The first and second freezer sections 14 and 16 are vertically arranged so that the food product moves generally downwardly within the freezing apparatus 2 from the entrance 6 at the top of the housing 4 to the exit 10.

As shown in FIG. 1, the first freezer section 14 includes a single immersion bath 18 comprised of a vessel 20 containing a liquid cryogen 22. As used herein the term "liquid cryogen" shall include all cryogenic substances in liquid form including nitrogen, helium, argon and the like. Nitrogen is the preferred liquid cryogen because of its ready availability and low cost.

Passing through the bath of liquid cryogen is a conveyor belt 24 which carries the food product 8 entering the freezing apparatus 2 from one end 26 of the bath 18 to the opposite end 28 thereof. The conveyor belt 24 travels through a circuitous path over opposed rollers 30, 32 to provide continuous transportation of food product entering the first freezer section 14.

The food product 8 entering the immersion bath 18 is partially frozen by heat exchange with the liquid cryogen 22. Cryogenic vapor is thereby produced and is drawn downwardly into the second freezer section 16 as explained hereinafter.

Exiting the immersion bath 18 over the roller 32 is a partially frozen food product 34 which falls downwardly into the second freezer section 16. The second freezer section is comprised of a conveyor belt 36 passing in a circuitous route over respective upper rollers 38a, 40a and lower rollers 38b, 40b so that the food product 12 travels from one end 42 to an opposed end at 44 of the conveyor belt 36 which lies in proximity to the exit 10.

The partially frozen food product 34 tumbles onto the conveyor belt 36 where it is subjected to further chilling by the cryogenic vapor from the first freezer section 16. The cryogenic vapor is drawn downwardly from the first freezer section by the presence of a blower or fan 46 and an exhaust vent 45. The exhaust system operates by keeping the internal pressure just inside the entrance 6 about equal to atmospheric pressure. The pressure within the freezing apparatus 2 gradually decreases from the first freezer section 14, to the second freezer section 16, to the exhaust vent 45. Vapor pressure within the freezing apparatus, owing to the generation of the cryogenic vapor, generally exceeds atmospheric pressure. As a result, the cryogenic vapor is drawn toward the exhaust vent 45.

As shown specifically in FIG. 1, a single fan 46 is placed below the conveyor belt 36. The fan 46 serves to redirect the flow of the cryogenic vapor upwardly through the conveyor belt 36 to contact the food product 12 being transported thereon.

The efficiency of freezing in the second freezer section is improved by providing a solid baffle plate 33 across a substantial portion of the area of the housing 4 separating the first freezer section 14 from the second freezer section 16. The plate 33 prevents most of the cryogenic vapor being blown upwardly from leaving the second freezer section 16. An opening 35 is provided between the outer edge of the plate 33 and the housing 4 to permit the partially frozen food product as well as cryogenic vapor to leave the first freezer section 14 and enter the second freezer section 16.

The efficiency of freezing in the second freezer section 16 is also improved by providing a diffuser plate 37 below the conveyor belt 36 in the second freezer section 16 to more uniformly distribute the upward flowing cryogenic vapor. Details of the diffuser plate are provided hereinafter in connection with the discussion of FIG. 8.

The fan 46 also recirculates the cryogenic vapor generated in the first freezer section 14 to provide continuous chilling of the food product 12 in the second freezer section 16.

The velocity of flow of the cryogenic vapor upwardly through the conveyor belt 36 may be adjusted by adjusting the speed of the motor 48. If a sufficient velocity is provided, the food products on the conveyor belt 36 are caused to tumble thereby creating a fluidized bed which minimizes adherence of the individual pieces of food product to each other.

In certain instances, it may be desirable to transport the food product over the conveyor belt without tumbling. In this embodiment, the second freezer section 16 operates in a fixed bed mode. This embodiment can be instituted by limiting the force of the cryogenic vapor flowing through the conveyor belt 36 to a level below that required for fluidization.

The cryogenic vapor directed to the second freezer section 16 completes the freezing operation. The frozen food product 12 then leaves the freezing apparatus through the exit 10. A fluid flow barrier such as a flapper plate 50 may be provided at the exit 10 to minimize entry of ambient air into the freezing apparatus and to minimize the loss of the cryogenic vapor through the exit 10. The flapper plate 50 can be constructed of light gauge sheet metal and like materials. It is pivotally connected to the freezing apparatus and therefore moveable from an open position to allow frozen food product to proceed through the exit to a closed position which substantially prevents the passage of cryogenic vapor out of the exit when food product is not present.

Figure 2:
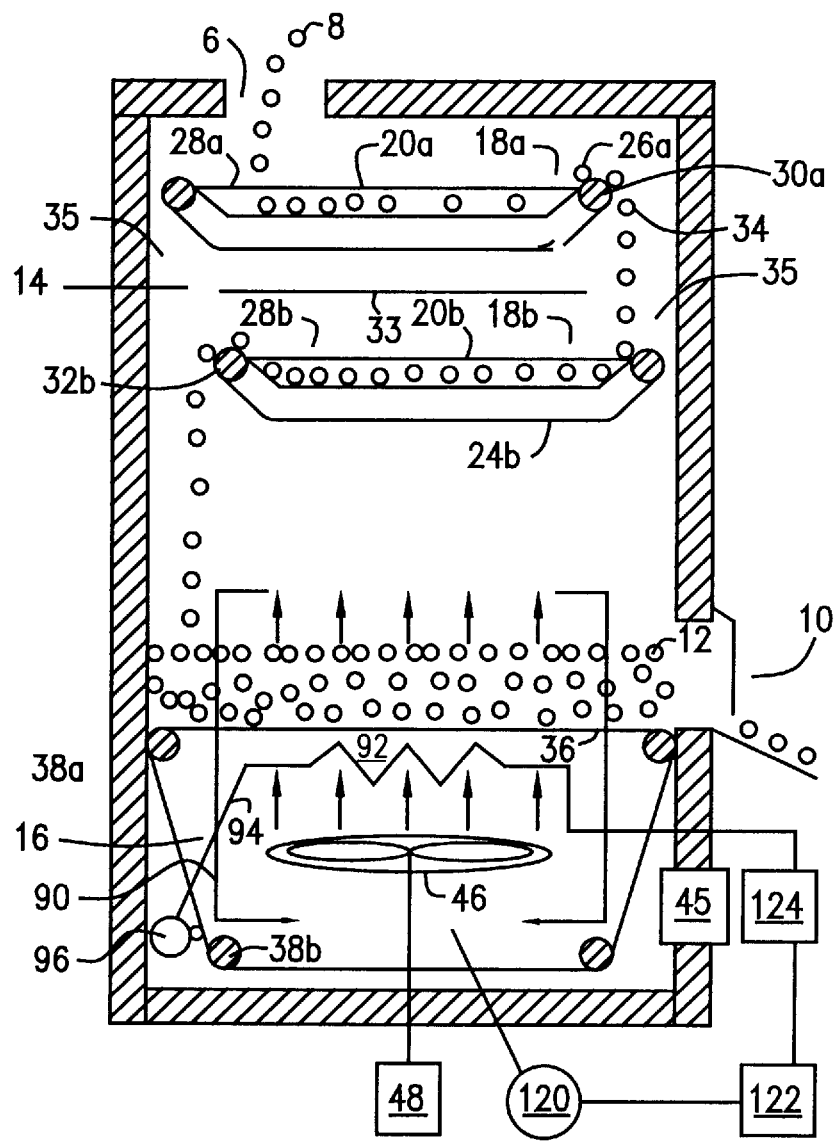
FIG. 2 is a schematic cross-sectional view of an embodiment of the invention employing two vessels each containing a liquid cryogen in the first freezer section.

The present invention may be provided with more than one immersion bath in the first freezer section. Referring specifically to FIG. 2, there is shown an embodiment of the invention utilizing two immersion baths 18a and 18b. The uppermost bath 18a is positioned off center of the lowermost bath 18b. As a result, the food product 34 which leaves the uppermost bath 18a falls downwardly into the bottommost bath 18b, and then travels in the opposite direction where it leaves the bottommost bath and falls downwardly onto the conveyor belt 36 of the second freezer section 16, which is a baffle plate 33 is present, through the opening 35 between the baffle plate 33 and the housing 4.

In operation, the unfrozen food product 8 enters the food apparatus 2 through the entrance 6 where it falls into the immersion bath 18a containing liquid cryogen at the end 28a of the vessel 20a. The conveyor belt 24a transports the food product through the vessel 20a to the end 26a thereof and over the roller 30a where the partially frozen food product 34 falls into the immersion bath 18b, because the same extends beyond the edge of the immersion bath 18a.

The partially frozen food product, while immersed in the immersion bath 18b within vessel 20b, is transported by the conveyor belt 24b traveling in the opposite direction of movement of the conveyor belt 24a. The food product is eventually transported to the end 28b of the immersion bath 18b and over the roller 32b where it falls into the second freezer section 16. If a baffle plate 33 is present, the food product as well as cryogenic vapor passes through the opening 35 between the baffle plate 33 and the housing 4.

The movement of the respective conveyor belts 24a and 24b in opposite directions enables the respective vessels 20a and 20b to be arranged vertically and thereby minimize the length of the freezing apparatus.

The travel path of the food product from the entrance 6 to the exit 10 in the present freezing apparatus is forward and backwards as the food product progresses through the vessels 20a and 20b and downwardly as the food product moves between the vessels. In this arrangement a plurality of immersion baths and the combination of first and second freezer sections as defined herein may be employed which occupy substantially the same length of floor space as a single immersion bath system or a single freezer tunnel system.

The embodiment of FIG. 2 contains a second freezer section 16 substantially as described in connection with FIG. 1. The food product which has fallen from the second vessel 20b lands on the conveyor belt 36 and is transported in the direction opposite to the direction of movement of the conveyor belt 24b. While in transit, the food product is further chilled with cryogenic vapor drawn from the first freezer section 14 and redirected upwardly by the fan 46 and motor 48. The cryogenic vapor is preferably driven upwardly through the conveyor belt 36 with sufficient force to create a fluidized bed to insure that the frozen food particles are completely separated during the final freezing operation. Alternatively, the force of the flow of cryogenic vapor may be reduced so that the frozen food particles are chilled in a fluidized bed mode as previously described in connection with the embodiment of FIG. 1.

The flow of the cryogenic vapor upwardly through the second freezer section 16 is preferably controlled so that the food product on the conveyor belt will be uniformly frozen. It is therefore preferable that each piece of food product be in contact with the same quantity of cryogen vapor.

The distribution of the cryogenic vapor during its upward flow is in part dependent on the position of the fan 46 within the housing 4. For example, as shown in FIG. 2, food product on the central region of the conveyor belt 36 (positioned directly above the fan 46) will receive more cryogenic vapor than food product positioned at the terminal portions of the conveyor belt. Accordingly, the fan 46 can not in and of itself provide uniform distribution of the cryogenic vapor.

In a preferred form of the invention, there is provided a means for distributing the upward flow of the cryogenic vapor uniformly through the entire surface area of the conveyor belt 36. The uniform distribution means can be provided in the form of a diffuser plate 37 as shown best in FIG. 8.

Referring to FIG. 8, the diffuser plate 37 is positioned below the conveyor belt 36 and comprises a base 300 having a plurality of rows 302, with openings 304 therein. The openings 304 can be in any shape including circles, ovals, triangles, squares, rectangles, polygons, and irregular shapes. The preferred shapes are those which maximize flow distribution because of their curvilinear cross-section. Accordingly the preferred shapes of openings include circles, ovals, and polygons(preferably at least six-sided).

The size of the openings will vary depending on the force of the upwardly flowing cryogenic vapor and the amount of food product traveling across the conveyor belt. Generally, the area of each opening will be in the range of from about 1 to 6 in$^2$, more typically from about 2 to 4 in$^2$. In addition the total surface area of the openings should be from about 30 to 50% of the total area of the diffuser plate, preferably about 40%. As a result of the arrangement of the openings, about 30% of the total pressure drop will occur across the diffuser plate at typical gas vapor velocities required for fluidization, while the remaining pressure occurs through the conveyor, the product and the vapor returning to the blower or fan.

The openings need not be the same size. The selection of the size of the openings and the positioning of the larger openings and the smaller openings will depend on the force of the cryogenic vapor across the diffuser plate. In those areas of the diffuser plate where the flow of cryogenic vapor is at its greatest, the size of the openings in that region can be reduced. In areas of lower flow, the size of the openings can be increased.

The openings are arranged in rows from as little as a single row 306 to multiple rows designated by numeral 308. The arrangement of the rows is selected to slow down the flow of the product towards the exit so that the product flow rate does not exceed the speed of the conveyor thus assuring an orderly discharge of the product at the exit.

It has also been found that the distribution of the cryogenic vapor is improved when there are regions 310 of no openings placed between groupings of rows as specifically shown in FIG. 8. It is believed that the areas of no openings 310 act as a buffer against excess cryogenic vapor coming through the diffuser plate 37. This prevents the food product from moving along the conveyer belt at a faster speed than is desirable for uniform freezing.

The diffuser plate 37 is preferably attached to the housing 4 through a hinge mechanism 312 so that the diffuser plate 37 may be moved away from the conveyor belt 36 to facilitate cleaning thereof.

Because air can infiltrate through the entrance and exit of the freezing apparatus, the conveyor belt in the second freezer section may become laden with ice particles. In addition, the conveyor belt can retain particles of the frozen food products as they pass through the second freezer.

There may therefore be a need to clean the conveyor belt to remove the ice particles and particles of food. One such cleaning system is disclosed in Ron C. Lee et al., U.S. Pat. No. 5,349,828, incorporated herein by reference. In this system a liquid cryogen conduit conveys a stream of liquid cryogen into the freezing chamber. The stream is then vaporized by a vaporizer to form cryogenic vapor which is passed through a nozzle or the like to form a jet of cryogenic vapor directed against the conveyor belt. The stream has sufficient force so as to be able to dislodge the ice and food particles attached to the conveyor belt.

Referring to FIG. 2 there is shown a similar cleaning device for removing ice and food particles and the like. The cleaning device 90 generally includes a vaporizer, shown schematically and identified by reference numeral 92 and a conduit 94 connecting the vaporizer 92 to at least one nozzle 96. The vaporizer 92 itself is connected to a source of liquid cryogen (not shown) which may be the same source which supplies liquid cryogen to the vessels 20a and 20b.

The vaporized liquid cryogen is ejected out of the nozzle 96 onto the conveyor belt 36. It is preferred to use multiple nozzles 96 spaced apart across the width of the conveyor belt 36 to insure adequate cleaning.

As shown specifically in FIG. 2, the nozzle(s) 96 are preferably directed at the conveyor belt 36 at a position between the rollers 38a and 38b. Removal of the ice and food particles in this location insures that the conveyor belt 36 will be clean as it receives the partially frozen food product 12 arriving from the first freezer section 14.

The flow of cryogenic vapor out of the nozzles may be continuous, intermittent or the flow of cryogenic vapor may be discontinued for significant periods of time depending on the rate of buildup of ice particles and/or the extent to which food particles adhere to the conveyor belt 36.

The flow of cryogenic vapor through the nozzles may also be used to control the temperature of the second freezer section. The temperature within the second freezer section 16 is preferably maintained at a constant level. There are numerous methods of maintaining the temperature constant including adjusting the flow of cryogen into the freezer, varying the residence time of the food product within the cryogen and the like.

One such temperature control system employs a temperature control loop for maintaining the second freezer section 16 at a predetermined temperature. The cryogenic vapor generated in the first freezer section, through heat exchange between the food product and the liquid cryogen, may be insufficient to provide sufficient cooling for the second freezer section. It may therefore be necessary to add cryogen directly into the second freezer section.

Referring to FIG. 2 the cryogen may be delivered to the vaporizer 92 and passed into the second freezer section 16 through the same nozzles 96 used to clean the conveyor belt 36. For example, the temperature in the second freezer section 16 is sensed by a temperature sensor 120. If the sensed temperature is higher that the predetermined set temperature established in the temperature controller 122, a signal corresponding to the difference in temperature is generated. The signal operates to increase the opening of a control valve 124 to allow additional cryogen to enter the vaporizer 92 to be ejected out of the nozzle(s) 96. Additional cryogen can be added until the actual temperature sensed by the temperature sensor equals the predetermined temperature.

Conversely, if the temperature is too low, less cryogen must be added. Accordingly, the signal sent to the control valve 124 will decrease the opening and thereby lower the flow rate of the cryogen.

Another method of controlling the temperature within the second freezer section 16 is to control the rate at which cryogenic vapor is generated in first freezer section. By varying the rate of movement of the conveyor belt 24, the residence time of the food product in contact with the cryogen will vary as well. The longer the food product is in contact with the cryogen the greater will be the production of cryogenic vapor. For example, if the temperature in the second freezer section 16 is too high, then the rate of travel of the conveyor belt 24 in the first freezer section 14 can be reduced to thereby increase the residence time of the food product within the liquid cryogen containing immersion bath 18. The increased residence results in the generation of more cryogenic vapor which is drawn downwardly into the second freezer section 16 as previously described to thereby lower the temperature within the second freezer section 16.

Conversely, if the temperature in the second freezer section 16 is too low, the speed of the conveyor belt 24 can be increased to reduce the residence time of the food product within the immersion bath 18. As a result, less cryogenic vapor is produced and therefore less cryogenic vapor is available to cool the second freezer section 16.

Figure 7:
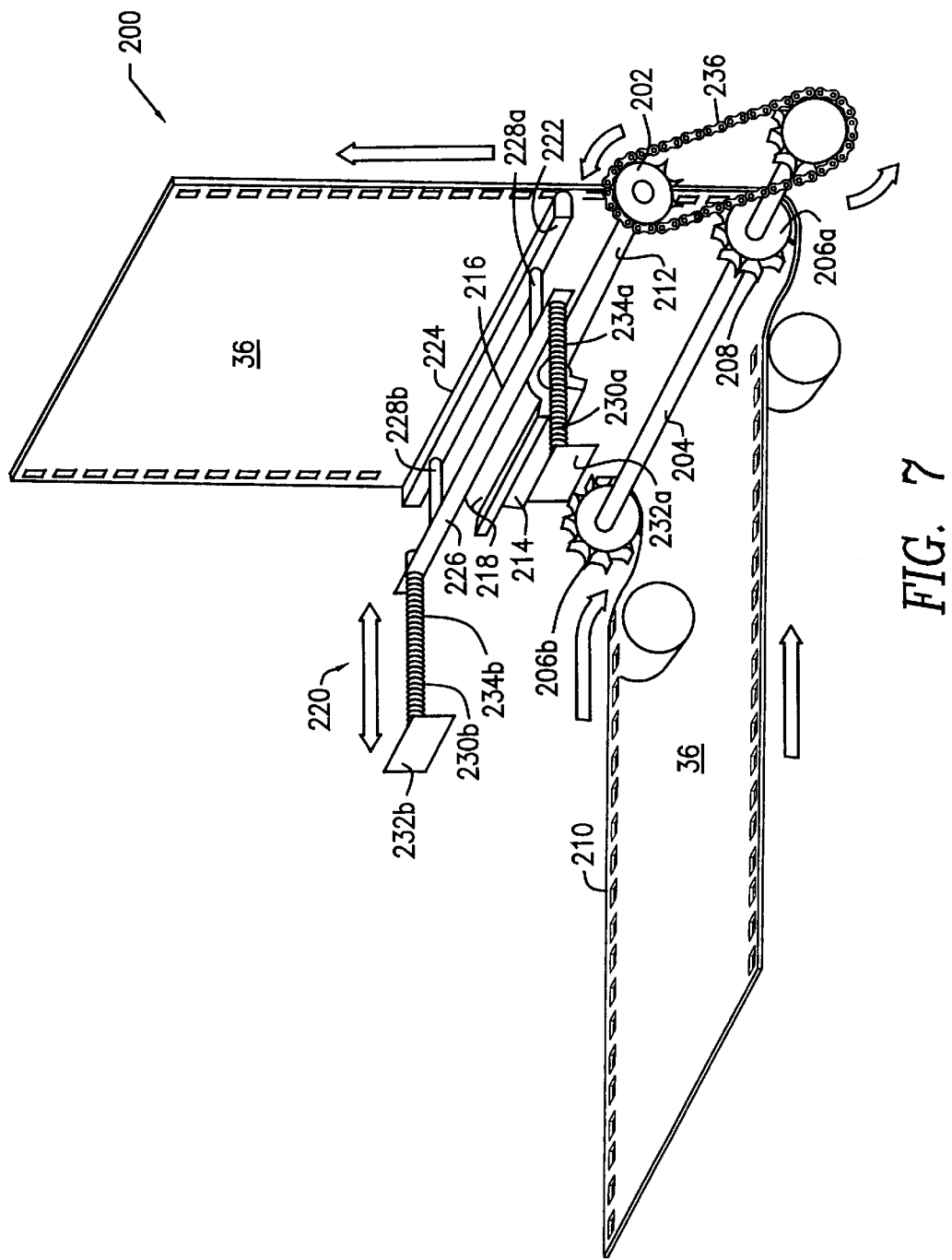
FIG. 7 is a perspective view of an embodiment of a cleaning assembly used to dislodge debris from the conveyor belt in the second freezer section.

A preferred cleaning system of the present invention is shown in FIG. 7. The conveyor belt used to convey the food product in the second freezer section provides the energy needed to drive an impact bar for periodically contacting the conveyor belt at a force sufficient to dislodge debris thereon such as residual food product and ice.

Referring specifically to FIG. 7, the cleaning assembly 200 includes a rotatable drive wheel assembly 202 which is operatively connected to and driven by the conveyor belt 36. The drive wheel assembly 202 includes a first bar 204 having opposed gears 206a and 206b each having respective teeth 208 for engaging corresponding holes 210 in the conveyor belt 36. Forward movement of the conveyor belt 36 causes the first bar 202 to rotate in a counterclockwise direction.

The rotatable drive assembly 202 includes a second bar 212 which is spaced apart from and downstream of the first bar 204. Attached to the second bar 212 is a cam device 214 for providing periodic movement to the impact bar as described hereinafter. The cam device 214 includes a plurality of spaced apart projections 216 defining corresponding valleys 218 there between for receiving the impact device 220.

As shown in FIG. 7, the impact device 220 includes an impact bar 222 having a head 224 for contacting the conveyor belt 36 at force sufficient to dislodge debris thereon. The impact bar 222 is connected to a bar 226 through a bar of opposed shafts 228a and 228b. The bar 226 engages the cam device 214 by traveling over the projections 216 and into the respective valleys 218. The bar 226 is maintained within its travel path over the cam device 214 through opposed shafts 230a and 230b, respective stoppers 232a and 232b and springs 234a and 234b.

Movement of the bar 226 over the cam device is provided by chain drive 236 which is provided rotational movement from the conveyor belt 36 through the bar 204 and gears 206a and 206b. The chain drive 236 thereby rotates the bar 212 causing the cam device 214 to rotate in a like direction. As the cam device 214 rotates, the bar 226 moves along a valley 218 where it is engaged by one of the projections 216. This movement causes the bar 226, and thereby the impact bar 224, to be pulled away from the conveyor belt 36.

As the bar 226 is pulled away from the conveyor belt 36, tension is built up owing to the compression of the springs 234a and 234b. When the bar 226 rises above the projection 216 and is thereby released, the springs 234a and 234b are likewise released thereby enabling the impact bar to contact the conveyor belt 36 with a force sufficient to dislodge any debris that may be contained on the conveyor belt 36. Movement of the impact bar 222 from engagement by the cam device 214 thereby generates the periodic movement of the impact device 220 which results in the efficient removal of debris from the conveyor belt 36.

The force necessary to remove debris from the conveyor belt 36 can be varied by varying the distance of travel of the impact bar 222 and/or the compression of the springs 234a and 234b. In general, the force applied to the impact bar 222 can be increased by increasing the distance between the impact bar and the conveyor belt 36 and/or the compression of the springs 234a and 234b.

In a further embodiment of the invention, a solid cryogenic substance (e.g. carbon dioxide snow) may be used in the first freezer section. The use of a solid cryogen eliminates the need for a vessel 20 as used in the embodiments of FIGS. 1 and 2.

Figure 3:
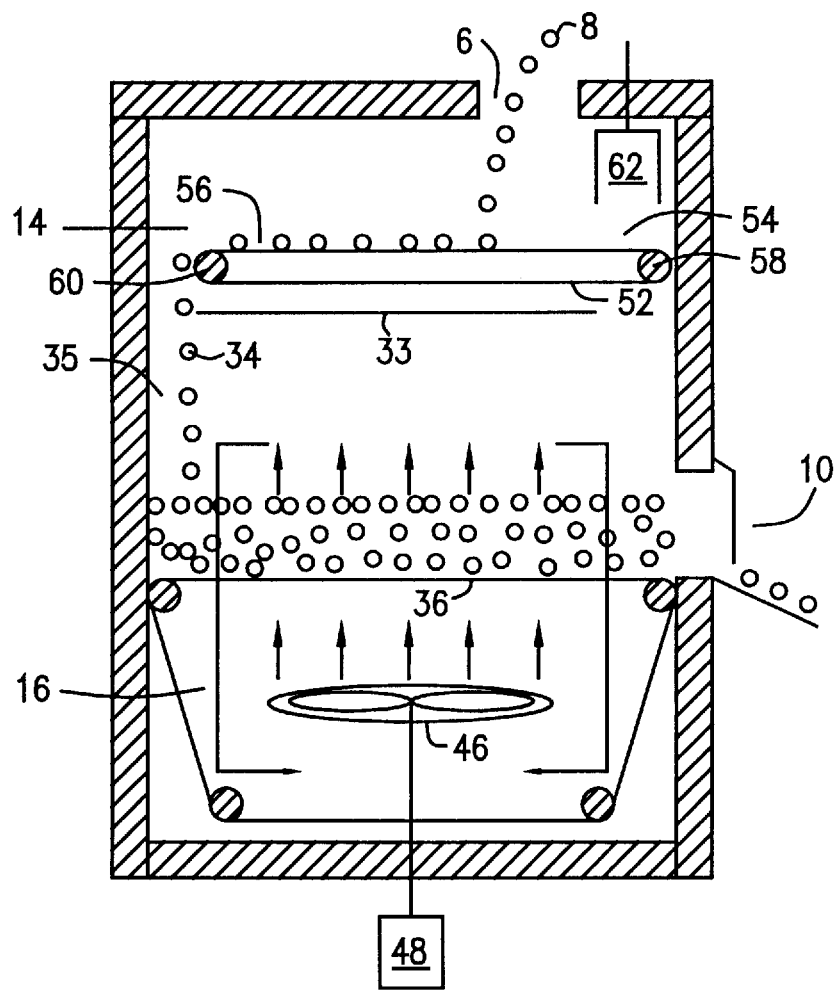
FIG. 3 is a schematic cross-sectional view of an embodiment of the invention employing a single conveyor in the first freezer section and a source of a solid cryogenic substance.

Referring to FIG. 3, the first freezer section 14 is comprised of a conveyor belt 52 which extends from one end 54 to an opposed end 56 about respective rollers 58 and 60. Mounted in vicinity of the end 54 is a conventional solid cryogen generating device 62 which generates a sufficient amount of solid cryogen (e.g. carbon dioxide snow) so as to at least partially freeze the food product being transported on the conveyor belt 52.

Therefore as unfrozen food product 8 enters through the entrance 6 it falls onto the conveyor belt 52 which transports the food product from the end 54 to the end 56. While on the conveyor belt 52 the unfrozen food product is contacted with a sufficient amount of solid cryogen to become at least partially frozen. During this operation heat exchange between the food product and the solid cryogen results in the production of cryogenic vapor which is drawn into the second freezer section 16 as previously described.

The partially frozen food product 34 falls onto the conveyor belt 36 of the second freezer section. The direction of movement of the conveyor belt 36 is opposite to the direction of movement of the conveyor belt 52. As a result, the first freezer section 14 and the second freezer section 16 may be constructed in a vertical arrangement to minimize the length of the freezing apparatus.

While being transported on the conveyor belt 36 toward the exit 10, the partially frozen food product is contacted with cryogenic vapor from the first freezer section 14 in the same manner described above in connection with the embodiments of FIGS. 1 and 2.

Figure 4:
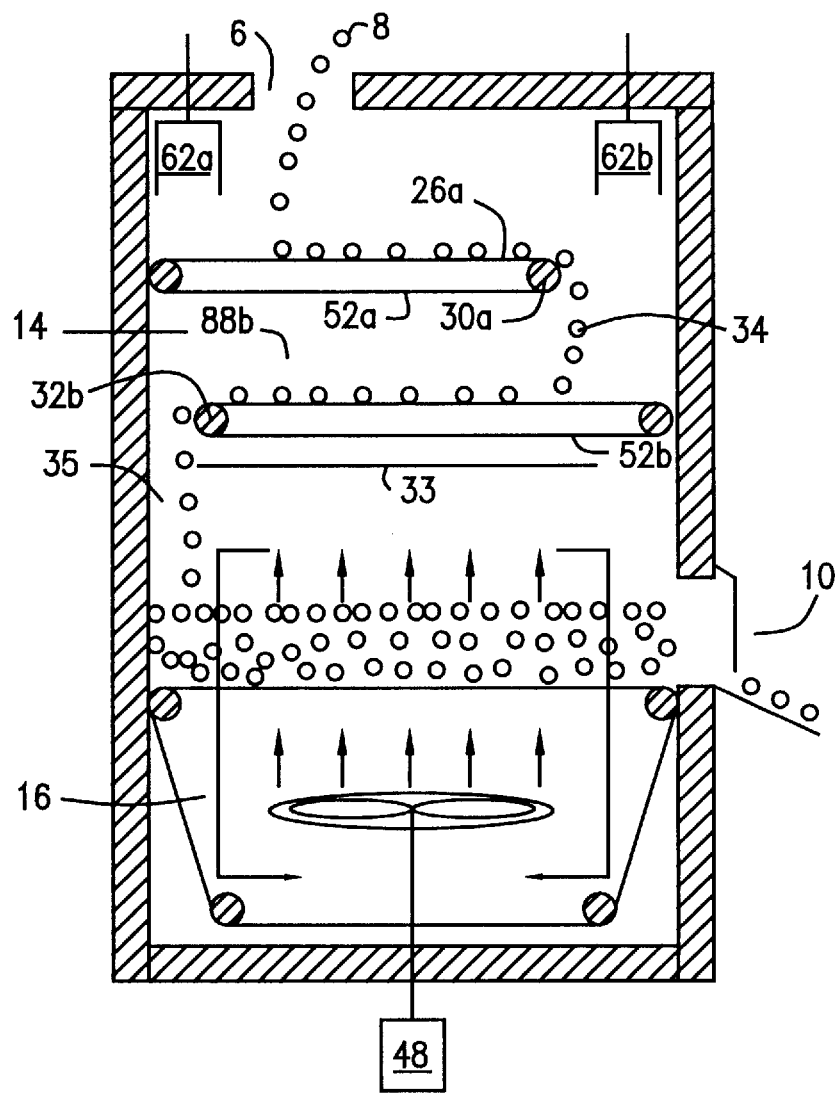
FIG. 4 is a schematic cross-sectional view of an embodiment of the invention employing two conveyors in the first freezer section and a source of a solid cryogenic substance.

Solid cryogen can be delivered to the first freezer section while the food product is transported on multiple conveyors. Referring to FIG. 4, there is shown a solid cryogen delivery system using dual conveyor belts arranged in a manner similar to the liquid cryogen embodiment shown in FIG. 2.

The first freezer section 14 contains a pair of conveyor belts 52a and 52b. The uppermost belt 52a is positioned off center of the lowermost belt 52b. As a result, the food product 34 which leaves the uppermost belt 52a falls downwardly onto the bottommost belt 52b, and then travels in the opposite direction where it leaves the bottommost bath and falls downwardly onto the conveyor belt 36 of the second freezer section 16. During its travel on the belts 52a and 52b, the food product is subjected to solid cryogen (e.g. carbon dioxide snow) from a conventional solid cryogen generating device 62a and 62b.

In operation, the unfrozen food product 8 enters the food apparatus 2 through the entrance 6 where it falls on the conveyor belt 52a while being contacted with solid cryogen through the solid cryogen generating device 62a. The conveyor belt 52a transports the food product to the end 26a thereof and over the roller 30a where the partially frozen food product 34 falls onto the second belt 52b, because the same extends beyond the edge of the first belt 52a.

The partially frozen food product, while in contact with the solid cryogen from the solid cryogen generating device 62b, is transported by the conveyor belt 52b traveling in the opposite direction of movement from the conveyor belt 52a. The food product is eventually transported to the end 28b of the belt 52b and over the roller 32b where it falls into the second freezer section 16.

As shown in FIG. 4, the movement of the respective conveyor belts 52a and 52b in opposite directions enables the first freezer section 14 to be arranged directly above the second freezer section 16 and thereby minimize the length of the freezing apparatus. The operation of the second freezer section 16 is the same as previously described in connection with the embodiments of FIGS. 1–3.

The first freezer section 14 may be provided with a liquid cryogen which flows downwardly through at least one angled trough, preferably under turbulent flow conditions. In this embodiment, the first freezer section 14 can employ the principles of construction and operation disclosed in Jack Appolonia, U.S. patent application Ser. No. 08/282,057 filed Jul. 28, 1994, incorporated herein by reference.

The troughs are adapted to house a flow of liquid cryogen and the food product as the food product at least partially freezes and to transport the same to the second freezer section 16.

The extent to which the individual pieces of food are frozen is dependent on the residence time of the food product in the liquid cryogen, the depth of the liquid cryogen and the temperature of the food entering the freezer.

The residence time of the food product within the liquid cryogen is dependent on the length of the trough and its angle of inclination q. The longer the trough, the greater the time the food product will be in contact with the liquid cryogen and, therefore, the greater the extent of freezing. Conversely, as the angle of inclination q increases, the time the food product is in contact with the liquid cryogen decreases resulting in a lesser degree of freezing. The preferred angle of inclination is from about 0.5° to 5.0°.

The depth of the liquid cryogen is also a factor in the freezing of the food product. The depth of the liquid cryogen should be sufficient to allow all sides of the food product to be in contact with the liquid refrigerant for a time sufficient to freeze at least the outer surface thereof. It is desirable to maintain the depth of the liquid cryogen within the range of from 0.5 D to 2.0 D, preferably 0.5 D to 1.5 D, where D is the maximum thickness of the food product.

Figure 5:
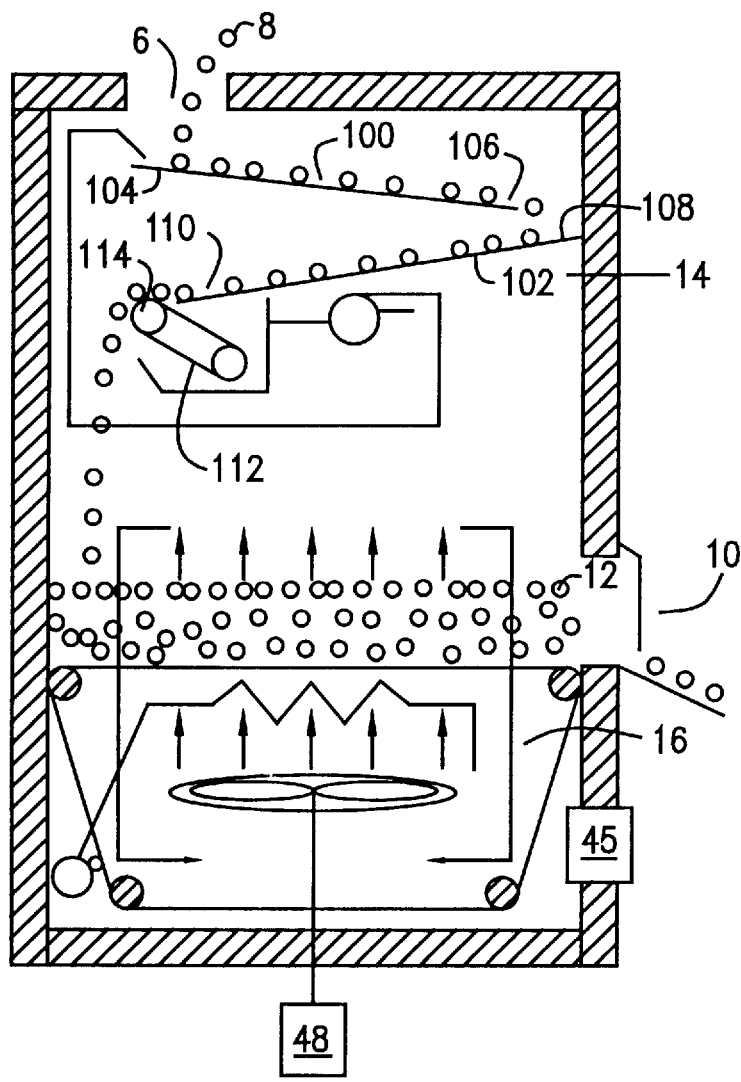
FIG. 5 is a cross-sectional view of an embodiment of the invention utilizing a downwardly sloping trough configuration containing a liquid cryogen for use in the first freezer section.

Referring to FIG. 5 there is shown a first freezer section 14 containing two angled troughs 100 and 102, respectfully, each angled downwardly by an angle q of preferably about 0.5° to 5° to create a flow of liquid cryogen and food product from the rear end 104 of the trough 100 to the front end 106 thereof. The liquid cryogen and the food product fall into the second trough 102 which is angled downwardly by an angle q away from the trough 100 from a rear end 108 to a front end 110.

There is also provided a conveyor belt 112 which receives the food product from the lower trough 102 and passes the same over a roller 114 so that the food product may fall into the second freezer section 16 where the food product is further chilled as described in connection with FIGS. 1–4.

Figure 6A:
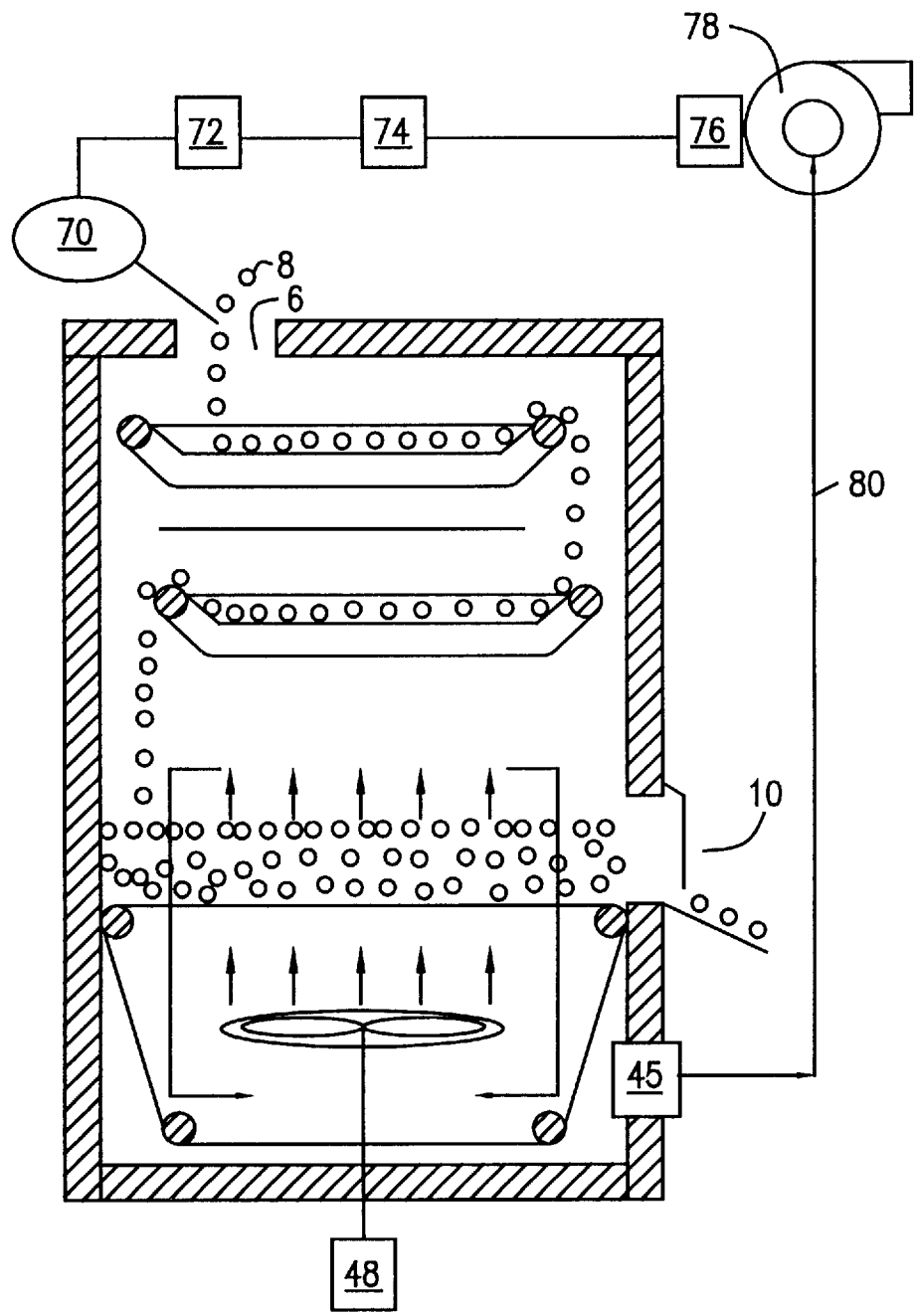
FIG. 6A is a schematic cross-sectional view of an embodiment of the invention similar to FIG. 1 with a system for removing exhaust gas in a controlled manner from the freezer.

The freezing apparatus of the present invention may be provided with an exhaust system for controlling the rate of exhaust gas removal. Referring to a first embodiment as shown in FIG. 6A, a temperature sensor 70 such as a thermocouple, infrared sensor or the like senses the temperature within the entrance 6 of the freezing apparatus 2 and translates the temperature into a signal. The signal is transmitted to a temperature controller 72 which compares the signal to a predetermined set point temperature and generates a signal corresponding to the difference between the actual temperature within the entrance 6 and the predetermined set point temperature. The signal from the temperature controller 72 is sent to a motor controller 74.

The motor controller varies the speed of a gas motive device 76, such as an electric motor which is coupled to a fan 78 located external to the housing 4 of the freezing apparatus 2. The fan 78 is operatively connected to the interior of the housing 4 through a duct 80.

The exhaust control system varies the amount of cryogenic vapor drawn out of the freezing apparatus and thereby the amount of air being drawn into the freezing apparatus through the entrance. A temperature sensor at the entrance of the freezing apparatus is used as an indicator of the air flow direction. If the flow is out of the entrance, the sensed temperature decreases and once below a predetermined set point the fan speed is increased. Conversely, if air flow is into the freezing apparatus, the sensed temperature increases and once above the predetermined set point, the speed of the fan is reduced.

More specifically and with reference to FIG. 6A, if the temperature sensed by the temperature sensor 70 within the entrance to the freezing apparatus rises above the set point established in the temperature controller 72, it indicates that too much air is being drawn into the system from the outside of the freezing apparatus. The controller 72 then transmits a signal corresponding to this condition causing the fan 78 to operate at a reduced speed until the actual temperature in the entrance 6 equals the set point. Conversely, if the temperature sensed is below the predetermined desired temperature, the controller 72 will transmit a corresponding signal to increase the speed of the fan. The fan will then be adjusted to prevent the loss of cryogenic vapor at the entrance 6 of the freezing apparatus. The predetermined set point range is generally between the operating temperature of the freezing apparatus (e.g. −40° to −150° F.) and the temperature outside of the freezing apparatus (e.g. 50° to 100° F.). It is preferred that the set point of the exhaust control be identical to the freezer operating set point to ensure the specific enthalpy of any cryogen exiting the freezing apparatus at the entrance is the same as that exiting the exhaust vent thereby maximizing refrigeration utilization.

The embodiment shown in FIG. 6A effectively controls the rate of exhaust based on the entrance temperature and a predetermined temperature. However, when the freezing apparatus is first started the entrance temperature is typically much higher than the predetermined temperature. As a result the exhaust fan moves very slowly until the temperature of the apparatus approaches freezing temperature. During this time the rapid intake of cryogen can cause a loss of cryogen out of the entrance which can present a hazard to operators of the freezing apparatus.

To avoid cryogen loss at the entrance of the freezing apparatus, it is preferred to control the exhaust as a function of the difference between the entrance temperature and the temperature within the freezing apparatus (DT) compared to the predetermined setpoint based on the predetermined difference in the respective temperatures($DT_1$).

Figure 6B:
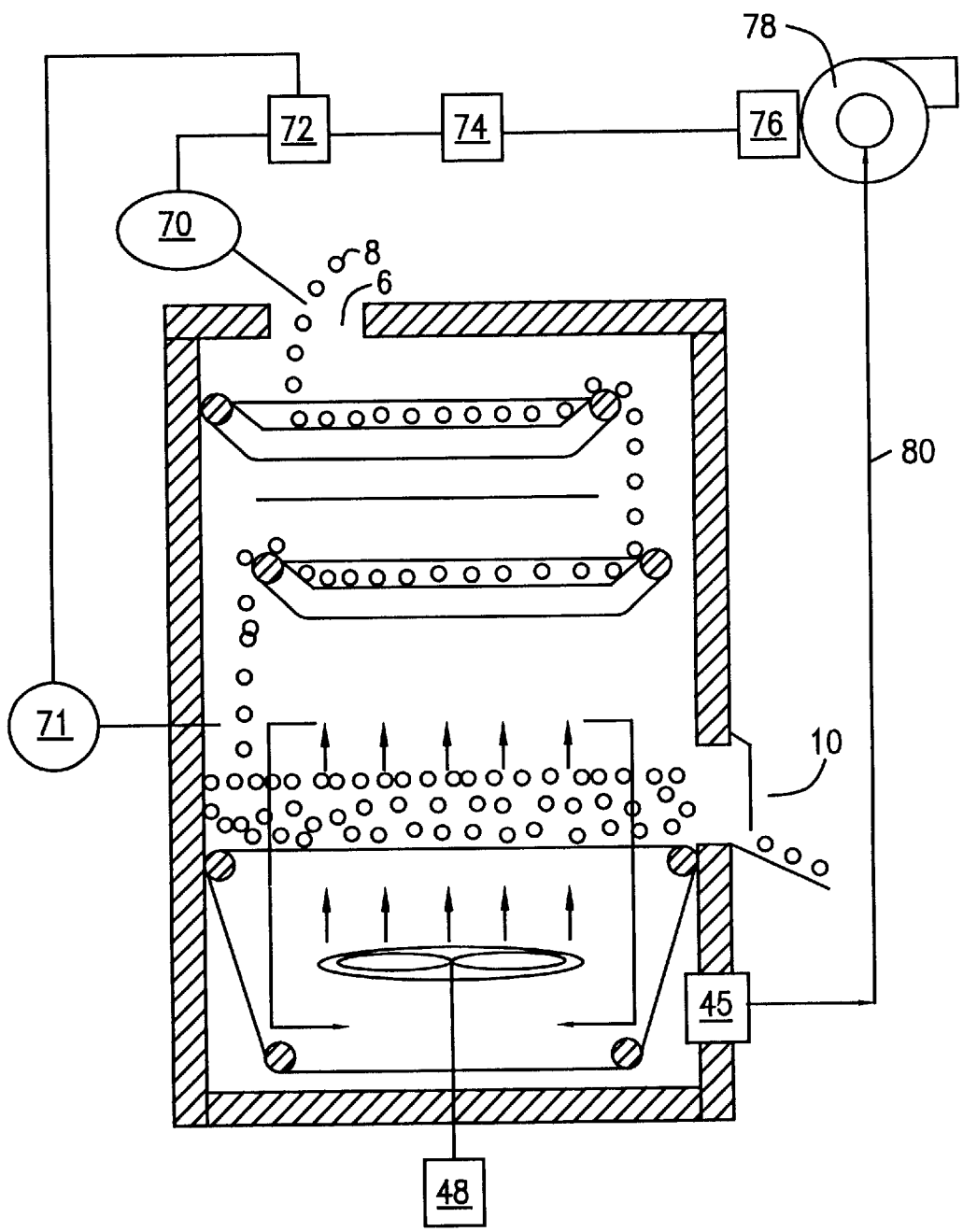
FIG. 6B is a schematic cross-sectional view similar to FIG. 6A, employing dual temperature sensors for removing exhaust gas in a controlled manner from the freezer.

Referring to FIG. 6B, there is provided a second temperature sensor 71 positioned within the housing 4, preferably between the first and second freezer sections 14 and 16. The sensor 71 measures the temperature within the freezing apparatus and generates a signal corresponding thereto and sends the signal to the temperature controller 72. The difference between the temperatures measured by the sensors 70 and 71 (DT) is compared to a predetermined set point corresponding to a predetermined temperature difference($DT_1$). If DT is greater than $DT_1$, then the speed of the exhaust fan is slowed until the value of DT decreases to a point where DT approximates $DT_1$. Conversely, if DT is less than $DT_1$ the speed of the fan is increased. In this embodiment of the invention, the speed of the fan is always sufficient to prevent backup of cryogen through the entrance, particularly during start up operations.

The present freezing apparatus supplies food through an entrance in the top of the housing. The predetermined temperature can be set between the temperature of the freezing apparatus and ambient because there is a significant difference in density between the cold, heavy gas within the freezing apparatus and the relatively warmer, lighter gas outside the freezing apparatus. Because of the significant difference in gas density, a set point between these two extremes can be selected which can differentiate between the cold cryogen vapor and the warm air vapor.

The amount of cryogenic vapor in the freezing apparatus may be determined in other ways, not just by sensing the temperature at the entrance. For example, an optical sensor may be used to measure the degree of cloudiness in the freezing apparatus which is directly related to the amount of cryogenic vapor therein. Other ways of measuring the amount of cryogenic vapor would be apparent to those skilled in the art.

The present invention may be modified to accommodate additional freezing operations. For example, a solid or liquid cryogen source may be positioned in proximity to the falling food product to provide additional cooling. Such a source could be positioned between the vessels 20a and 20b (as shown in FIG. 2), between the vessel 20b and the conveyor belt 36, or between the vessel 20 or conveyor belt 52 and the conveyor belt 36 in the embodiments, for example, shown in FIGS. 1 and 3, respectively.

EXAMPLE

Utilizing an embodiment of the invention as shown in FIG. 2, two thousand pounds per hour of steam-cooked and water-chilled seafood product are fed through the top of a 4×5×6 foot tall insulated enclosure. The articles land in a bath of liquid nitrogen. A conveyor belt removes the articles from the bath and deposits them into a second immersion bath. A second conveyor removes the articles from the second bath and deposits them on the conveyor belt of the second freezer section.

The immersion baths generally contain sufficient liquid so as to substantially cover the food articles. A top immersion bath is approximately 10½" wide and 24" long. A bottom immersion bath is approximately 12½" wide and 28" long. Typical residence times in the liquid nitrogen bath are between 6 and 10 seconds. Actual residence times will depend on the temperature of the incoming food products. The immersion process removes roughly 50% of the total internal energy of the product. This removes sufficient heat from the surface of the food products to make them firm and practically dry. The ensuing tumbling action caused by transfer from the first immersion vessel to the second vessel aids in breaking up clumps of food articles.

The second freezer section of the freezing apparatus is approximately 18" wide by 5' long. Cold nitrogen gas developed during the immersion process is drawn into the second freezer section. The refrigeration available is used to continue the freezing process. In this instance, the final heat removal process is carried out in a fixed bed mode of operation. Operating temperatures of approximately −80° F. to −150° F. are used in this stage. The actual temperatures depend on production rate. The cooked and chilled seafood emerges from the fluidized bed freezer and is packed for storage and later processing.

What is claimed is:

1. Apparatus for freezing a food product comprising:
    a) a housing having an entrance for receiving unfrozen food product and an exit;
    b) a first freezing means for receiving an unfrozen food product from the entrance and for contacting said food product with a liquid or solid cryogen to at least partially freeze the food product and produce a cryogenic vapor;
    c) a second freezing means positioned below the first freezing means for further freezing the partially frozen food product and for directing the food product toward an exit; and
    d) circulation means for circulating the cryogenic vapor from the first freezing means to the partially frozen food product contained in the second freezing means with sufficient force to separate individual pieces of the food product from each other to thereby complete the freezing operation.

2. The apparatus of claim 1 wherein the first freezing means comprises a vessel containing a liquid cryogen and a conveyor belt traveling in a first direction through the liquid cryogen, said second freezing means including a conveyor belt traveling in a second direction toward the exit opposite to the first direction.

3. The apparatus of claim 1 wherein the first freezing means comprises a plurality of vessels arranged in a column each containing a liquid cryogen, each vessel having a conveyor belt passing therethrough in a manner such that the direction of movement of each conveyor belt is opposite to the direction of movement of each conveyor belt in a preceding vessel.

4. The apparatus of claim 3 wherein the plurality of vessels are arranged off center so that the end of one vessel extends beyond the corresponding end of the vessel immediately below or above it wherein food product discharged from the end of an upper vessel falls into a lower vessel immediately below said upper vessel.

5. The apparatus of claim 4 comprising a top vessel and a bottom vessel, each containing a conveyor belt, said top vessel having a conveyor belt for receiving the unfrozen food product and for passing the unfrozen food product in a first direction through the liquid cryogen and over an end of the top vessel, said bottom vessel having a conveyor belt for receiving the food product from the end of the top vessel and for passing the food product through the liquid cryogen in a second direction and over an end of the second vessel onto the second freezing means.

6. The apparatus of claim 1 wherein the liquid cryogen is liquid nitrogen.

7. The apparatus of claim 1 wherein the first freezing means comprises a conveyor belt traveling in a first direction for receiving the unfrozen food product and a solid cryogen generating means for generating a solid cryogen and for contacting the unfrozen food product with the solid cryogen, said second freezing means including a conveyor belt traveling in a second direction toward the exit opposite to the first direction.

8. The apparatus of claim 1 wherein the first freezing means comprises a plurality of conveyor belts arranged in a column, each conveyor belt moving in a direction opposite to the direction of movement of a preceding conveyor belt.

9. The apparatus of claim 8 wherein the plurality of conveyor belts are arranged off center so that the end of one conveyor belt extends beyond the corresponding end of the conveyor belt immediately below or above it wherein food product discharged from the end of an upper conveyor belt falls onto a lower conveyor belt immediately below said upper conveyor belt.

10. The apparatus of claim 9 comprising a top conveyor belt and a bottom conveyor belt, said top conveyor belt for receiving the unfrozen food product and moving in a first direction over an end of the top conveyor belt, said bottom conveyor belt for receiving the food product from the end of the top conveyor belt and for moving the food product in a second direction and over an end of the second conveyor belt onto the second freezing means.

11. The apparatus of claim 8 wherein the first freezing means comprises at least one solid cryogen generating device for generating a solid cryogen and for contacting the food product traveling on at least one of the conveyor belts with a solid cryogen.

12. The apparatus of claims 11 comprising a plurality of solid cryogen generating devices.

13. The apparatus of claim 12 wherein each solid cryogen generating device is positioned in proximity to a single conveyor belt so that the food product on each conveyor belt is contacted with solid cryogen from a separate solid cryogen generating device.

14. The apparatus of claim 1 wherein the first freezing means comprises at least one trough having a pair of opposed walls and a base defining at least one channel for housing the food product while in contact with the liquid cryogen, said trough being positioned above and angled downwardly from the entrance to the second freezing means.

15. The apparatus of claim 14 wherein the base has at least two spaced apart ridges traversing the base and extending between the opposed walls.

16. The apparatus of claim 14 comprising a plurality of inclined troughs, each trough having a rear end and a forward end, the forward end of an upper trough lying above the rear end of the next lowest trough, wherein the liquid cryogen and food product travel along the upper trough toward and out the forward end onto the rear end of the next lowest trough until the flow of liquid cryogen reaches the lowest trough.

17. The apparatus of claim 1 wherein the second freezing means comprises a conveyor belt for receiving the food product from the first freezing means and transporting the food product to the exit while the food product is contacted by the cryogenic vapor.

18. The apparatus of claim 17, further comprising cryogenic vapor distribution means for distributing the cryogenic vapor across the conveyor belt to thereby uniformly freeze the food product.

19. The apparatus of claim 18 wherein the cryogenic vapor distribution means comprises a plate positioned below and substantially parallel to the conveyor belt, said plate having at least one row of openings wherein the cryogenic vapor passes through the openings to contact the food product on the conveyor belt.

20. The apparatus of claim 19, wherein the plate comprises a plurality of groups of rows of openings wherein each group comprises at least one row of openings, and an area containing no openings between at least one pair of adjacent groups of rows.

21. The apparatus of claim 19, wherein the openings have the same area.

22. The apparatus of claim 19, wherein the openings within each row have the same area.

23. The apparatus of claim 19, wherein the openings within each row have different areas.

24. The apparatus of claim 19, wherein each of the openings has an area of from about 1 to 6 in$^2$.

25. The apparatus of claim 19 wherein the total surface area of the openings is from about 30 to 50% of the total surface area of the plate.

26. The apparatus of claim 19, further comprising means for disengaging the plate from its parallel position to facilitate cleaning thereof.

27. The apparatus of claim 17 further comprising cleaning means for cleaning the conveyor belt in the second freezing means.

28. The apparatus of claim 27 wherein the cleaning means comprises, a source of liquid cryogen, a vaporizer for converting the liquid cryogen to cryogenic vapor and at least one nozzle directed at the conveyor belt for converting the cryogenic vapor from the vaporizer into a stream of cryogenic vapor having sufficient force to clean the conveyor belt.

29. The apparatus of claim 28 comprising a plurality of nozzles arranged along the width of the conveyor belt.

30. The apparatus of claim 28 wherein at least one nozzle is positioned in proximity of the conveyor belt at a location before the conveyor belt receives food product from the first freezing means.

31. The apparatus of claim 30 further comprising means for controlling the flow rate of the cryogenic vapor through the nozzle.

32. The apparatus of claim 27 wherein the cleaning means comprises impact means operatively connected to the conveyor belt for periodically impacting the conveyor belt to thereby apply a periodic force to the conveyor belt sufficient to dislodge debris thereon.

33. The apparatus of claim 32 wherein the impact means comprises:

a) a rotatable drive wheel assembly operatively connected to the conveyor belt;

b) cam means engaged to the drive wheel assembly and adapted for periodically engaging and releasing an impact bar; and c) an impact bar for periodically contacting the conveyor belt at a force sufficient to dislodge the debris.

34. The apparatus of claim 33 wherein the rotatable drive wheel assembly comprises:

(a) a first bar operatively engaged to the conveyor belt and rotatable thereby;

(b) a second bar operatively engaged to the cam means, and rotatable in the same direction as the first bar; and (c) drive means operatively engaged to the first and second bars for rotating the second bar.

35. The apparatus of claim 34 wherein the drive means comprises a chain drive.

36. The apparatus of claim 33 further comprising spring means operatively engaged to the cam means for providing a force to the impact bar when it is released from the cam means.

37. The apparatus of claim 1 further comprising exhaust control means for controlling the amount of cryogenic vapor within the freezing apparatus.

38. The apparatus of claim 37 wherein the exhaust control means comprises:

(a) first temperature sensing means within the entrance of the housing for determining the temperature within the entrance of the freezing apparatus and for transmitting a first signal corresponding to a first sensed temperature of the first temperature sensing means;

(b) temperature comparing means for comparing the first signal to a first predetermined temperature and for generating a second signal corresponding to the difference between the first signal and the first predetermined temperature;

(c) a motor operatively connected to a fan for drawing exhaust gas from the freezing apparatus; and (d) a signal detection means for detecting the second signal from the temperature comparing means and adjusting the speed of the fan in response to the second signal.

39. The apparatus of claim 38 further comprising temperature control means for controlling the temperature within the freezing apparatus.

40. The apparatus of claim 39 wherein the temperature control means comprises:

(a) a second temperature sensing means within the freezing apparatus for determining the temperature therein and for transmitting a third signal corresponding to a second sensed temperature;

(b) said temperature comparing means for comparing the third signal to a second predetermined temperature and for generating a fourth signal corresponding to the difference between the third signal and the second predetermined temperature; and (c) cryogen dispensing means comprising a control valve responsive to the fourth signal for delivering a cryogenic vapor to the freezing apparatus in a manner such that the temperature in the freezing apparatus equals the second predetermined temperature.

41. The apparatus of claim 40 wherein the cryogen dispensing means further comprises at least one nozzle for delivering the cryogenic vapor to the freezing apparatus.

42. The apparatus of claim 40 wherein the temperature comparing means comprises:

means for comparing the first and third signals to provide a temperature difference (DT), means for generating a fifth signal corresponding to DT, means for comparing said fifth signal to a predetermined difference in temperature between the temperature within the entrance and the temperature within the freezing apparatus ($DT_1$), and for generating a sixth signal corresponding to the difference between DT and $DT_1$.

43. The apparatus of claim 1 wherein the circulation means circulates the cryogenic vapor with a force sufficient to form a fluidized bed of the pieces of the food product in the second freezing means.

44. A method for freezing a food product comprising:

a) passing an unfrozen food product into the entrance of a freezing apparatus having a first freezing section and a second freezing section below the first freezing section;

b) contacting the unfrozen food product with a liquid or solid cryogen in the first freezing section;

c) vaporizing a portion of the liquid or solid cryogen in the first freezing section and circulating the cryogenic vapor to the second freezing section with sufficient force to separate individual pieces of the food product from each other; and d) transporting the food product from the first to the second freezing section and freezing the food product contained therein with the cryogenic vapor obtained from the first freezing section.

45. The method of claim 44 comprising circulating the cryogenic vapor to the second freezing section with sufficient force to form a fluidized bed of the pieces of food product in the second freezing section.

* * * * *